No. 798,996. PATENTED SEPT. 5, 1905.
C. P. DYER.
NUT LOCK.
APPLICATION FILED NOV. 4, 1904.

WITNESSES.
Frank G. Parker
F. A. Collins

INVENTOR.
Charles P. Dyer,
By Reuben L. Roberts.
Atty.

UNITED STATES PATENT OFFICE.

CHARLES P. DYER, OF SOMERVILLE, MASSACHUSETTS.

NUT-LOCK.

No. 793,996.　　　Specification of Letters Patent.　　　Patented Sept. 5, 1905.

Application filed November 4, 1904. Serial No. 231,345.

*To all whom it may concern:*

Be it known that I, CHARLES P. DYER, a citizen of the United States of America, and a resident of Somerville, in the county of Middlesex and Commonwealth of Massachusetts, have invented certain Improvements in Nut-Locks, of which the following is a specification.

The invention relates to nut-locks, more particularly for use in connection with nuts for vehicle-axles or the like, where the wheel or pulley turns upon an axle and is held in place by a nut.

The invention is an improvement upon prior constructions in which the end of the axle is chambered and a plug therein is held in engagement with the nut by a spring.

Heretofore there has been described an axle and nut each with a chamber rectangular in cross-section and a rectangular plug to fit them; but such a construction is too expensive for successful practical use; also, a cylindrical chamber in the axle and a cylindrical plug with a pin through a hole in the axle and a slot in the plug to prevent its turning in the chamber. This construction also has practical disadvantages, for the pin is liable to bind in the hole in the axle, which will make it difficult to remove and when removed will easily be lost.

My improvements consist in the peculiarities of construction of the chamber in the end of the axle, of the plug therefor, and other novel features of parts combined therewith, as hereinafter described, and particularly specified in the claims.

Figure 1:
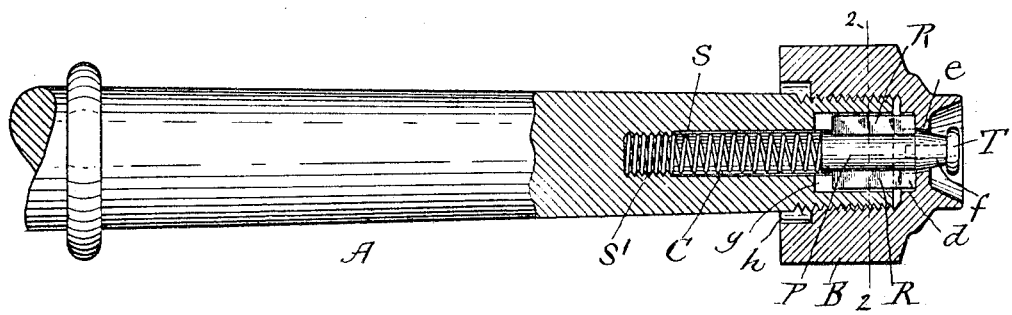
Figure 2:
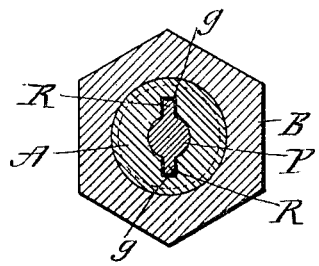
Figure 3:
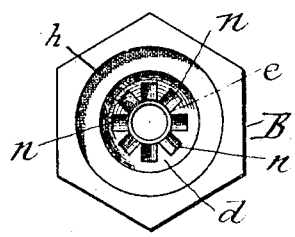
Figure 4:
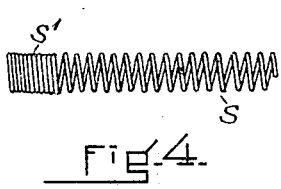
Figure 5:
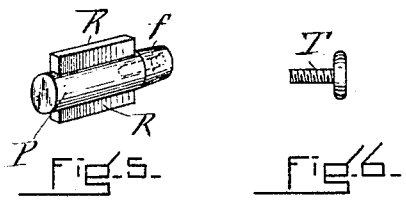
Figure 6:

In the drawings forming a part of this specification, Figure 1 shows the end of a vehicle-axle with the outer end thereof and the axle-nut in section to expose my improved construction. Fig. 2 is a cross-section through the nut and axle on line 2 2, Fig. 1. Fig. 3 is a plan view of the nut removed looking into the recess. Fig. 4 is the spring removed from the axle-chamber. Fig. 5 is the plug, and Fig. 6 is a screw with a large head to be screwed into the outer end of the plug and serve as one form of the means by which the plug is prevented from accidental separation from the nut when the latter is removed from the axle.

Referring to the drawings, A is an axle or shaft; B, the nut adapted to be screwed upon the end of the axle. C is the cylindrical chamber, bored longitudinally into the end of the axle. At the outer end of this chamber one or more grooves *g* are formed in the sides. Two oppositely-arranged grooves are illustrated. P is a plug provided with ribs or wings R to engage and slide in the grooves *g*. *f* is the frusto-conical end of the plug, which fits into a correspondingly-tapered hole *e* through the bottom of recess *d* of the nut B. In the remaining annular portion of the bottom of the recess *d* a plurality of notches *n* are formed. Eight such notches are shown; but any less number may be employed with practical success. The number of notches determine the subdivisions of the longitudinal adjustments of the nut upon the axle in each complete rotation of the nut. *h* is a shallow chamber counterbored in the end of the nut opposite to the tapered hole *e*, the diameter of which chamber is sufficiently large to loosely fit over the outer end of the unthreaded part of the axle, so that the nut B may be screwed on a little farther from time to time as needed to "take up" the wear of the axle-boxes. This feature obviates the expense and trouble of cutting off the extreme end of the axle, turning down the shoulder, and cutting additional screw-threads at the inner end of the threaded portion, which is the usual method heretofore employed for compensating for the wear of the axle-boxes. S is the spring within the axle-chamber C, and the means illustrated for preventing accidental displacement or ejection of the spring from the chamber consists in laying the wire of the spring at one end in a close coil *s'* and cutting a thread in the inner end of the chamber to correspond with the pitch of this close coil and then screwing the coil into it. This is a convenient and comparatively inexpensive way of accomplishing the result; but I do not confine my claim to this specific means. T is a screw with a head larger than the hole *e* in the bottom of the recess in the nut B, which screw is turned into a hole tapped in the frusto-conical end of the plug P, and its large head will prevent the plug from dropping from the nut B when the latter is removed from the axle. These safety devices will be found of great utility and convenience in the practical use of nut-locks of this character. The frusto-conical end upon the plug and the correspondingly-tapered seat therefor in the nut form a joint which practically completely excludes dust. The cylindrical chamber in the axle can be easily and economically drilled, even in old axles, and a convenient and economical way of forming the grooves in the side of the chamber is by drilling a small hole parallel with the chamber and partly cutting into it and then with a rectangular punch remove the superfluous metal at the opening into the chamber to form such rectangular grooves as are illustrated. The shape of the plug permits it to be drop-forged, and thereby produced ready for use without further operation upon it, and the entire construction of my improved nut-lock is a simplification of the several parts and great convenience and economy in the manufacture.

The diameter of the counterbored chamber $h$ in the nut should be made to correspond with the diameter of the unthreaded portion of the axle at the limit of its screw-threaded portion. At the present time it is usual to have a shoulder on the axle at this point, against which the axle-nut is screwed up tightly; but by the use of my improvements no shoulder on the axle is needed, and the nut is securely held against accidental turning in any position on the threaded part of the axle.

As will be readily understood, by pressing upon the head of the screw T the plug P can be moved inward and the ends of the wings R disengaged from the notches $n$, when the nut B can be easily turned in either direction.

I claim—

1. In combination with a screw-threaded axle, or the like, which is provided with a recessed nut, a nut-lock consisting of a cylindrical longitudinal chamber in the end of the axle, having one or more longitudinal grooves at its outer end, a cylindrical plug with wings or ribs to engage and slide within the grooved chamber, a plurality of notches in the bottom of the recess of the nut, and a spring in the chamber to hold the ribs of the plug, normally in engagement with said notches.

2. In combination with a screw-threaded axle or rod, a cylindrical longitudinal chamber in the end thereof, with one or more longitudinal grooves in the side of the chamber along its outer portion, a cylindrical plug with longitudinal wings or ribs to engage and slide within the grooved chamber, a recessed nut adapted to screw upon the end of the axle, and provided with a plurality of notches in the bottom of its recess, a spring in the axle-chamber to keep the ribs of the plug normally in engagement with such notches, a frusto-conical end to the plug and a correspondingly-shaped hole therefor in the nut.

3. In combination with a screw-threaded axle or rod, which is provided with a recessed nut, a cylindrical longitudinal chamber in the end of the axle, a plurality of notches in the bottom of the nut-recess, a sliding plug in the chamber adapted to engage the sides thereof and the notches in the nut-recess, a spring in the axle-chamber to hold the plug normally in engagement with the notches in the nut, and means at the inner end of the chamber to secure the spring against accidental displacement when the plug is removed.

4. A lock for the nut of an axle or the like, consisting of a longitudinal chamber in the end of the axle, a recessed nut for the axle having notches in the bottom of the recess, a sliding plug in the axle-chamber with means to engage the sides of the chamber and the notches in the nut, and a means to prevent separation of the plug and nut, when the nut is removed.

5. In combination with a screw-threaded axle, a nut provided with a counterbored chamber at its inner end to overlap the unthreaded end of the axle, and means to hold the nut against accidental rotation after it is in engagement with the threaded portion of the axle.

CHARLES P. DYER.

Witnesses:
F. A. COLLINS,
R. L. ROBERTS.